United States Patent [19]
Helgeland

[11] Patent Number: 5,975,536
[45] Date of Patent: Nov. 2, 1999

[54] ROTARY MOTION FEEDTHROUGH WITH ROTATING MAGNET SYSTEM

[75] Inventor: Walter Helgeland, Quechee, Vt.

[73] Assignee: Rigaku/USA, Inc., Danvers, Mass.

[21] Appl. No.: 08/940,777

[22] Filed: Sep. 30, 1997

[51] Int. Cl.⁶ .............................. F16J 15/40; F16J 15/53
[52] U.S. Cl. .......................................... 277/410; 310/90.5
[58] Field of Search ............................. 277/410; 310/90.5

[56] References Cited

U.S. PATENT DOCUMENTS

| | | |
|---|---|---|
| 3,612,630 | 10/1971 | Rosensweig . |
| 3,620,584 | 11/1971 | Rosensweig . |
| 3,734,578 | 5/1973 | Rosensweig . |
| 3,810,055 | 5/1974 | Wright . |
| 3,917,538 | 11/1975 | Rosensweig . |
| 3,940,150 | 2/1976 | Martin et al. . |
| 4,043,616 | 8/1977 | Zimmer . |
| 4,054,293 | 10/1977 | Hoeg et al. . |
| 4,281,724 | 8/1981 | Garrett . |
| 4,309,040 | 1/1982 | Pierrat . |
| 4,489,950 | 12/1984 | Chorney ................................... 277/410 |
| 4,502,700 | 3/1985 | Gowda et al. . |
| 4,526,382 | 7/1985 | Raj et al. . |
| 4,527,805 | 7/1985 | Gowda et al. . |
| 4,605,233 | 8/1986 | Sato . |
| 4,671,679 | 6/1987 | Heshmat ............................. 277/410 X |
| 4,865,334 | 9/1989 | Raj et al. . |
| 4,995,622 | 2/1991 | Fuse . |
| 5,007,513 | 4/1991 | Carlson . |
| 5,124,060 | 6/1992 | Yokouchi et al. . |
| 5,165,701 | 11/1992 | Koba ....................................... 277/410 |
| 5,215,313 | 6/1993 | Yokouchi ............................... 277/410 |
| 5,474,302 | 12/1995 | Black, Jr. et al. . |
| 5,554,900 | 9/1996 | Pop, Sr. . |
| 5,660,397 | 8/1997 | Holtkamp ............................... 277/410 |
| 5,826,885 | 10/1998 | Helgeland . |

FOREIGN PATENT DOCUMENTS

| | | |
|---|---|---|
| 3332818 A1 | 3/1984 | Germany . |
| 3713567 C1 | 12/1987 | Germany . |
| 3842477 A1 | 1/1990 | Germany . |
| 60-172775 | 9/1985 | Japan . |
| 2-51668 | 2/1990 | Japan . |
| 3-172617 | 7/1991 | Japan . |
| 1827485-A1 | 4/1991 | U.S.S.R. . |

OTHER PUBLICATIONS

Genmark Pole Piece shown in drawings 94111810, 94111801 and 94111800 of Rigaku/USA, Inc. sold Feb. 16, 1995.

*Primary Examiner*—Anthony Knight
*Attorney, Agent, or Firm*—Hamilton, Brook, Smith & Reynolds, P.C.

[57] ABSTRACT

A rotary motion feedthrough for coupling rotary motion from a rotatable shaft between an atmospheric side to a vacuum side includes a dynamic magnetic seal formed of magnets separated by pole rings which rings are formed integral with the shaft to form a magnetic system which rotates with the shaft.

18 Claims, 5 Drawing Sheets

ROTARY MOTION FEEDTHROUGH WITH ROTATING MAGNET SYSTEM

BACKGROUND OF THE INVENTION

Ferrofluid sealed rotary feedthroughs are well known in the art as devices for transmitting motion through the walls of vacuum chambers. A typical feedthrough device is shown in FIGS. 1A and 1B. The device employs a housing 10, bearings 12 and rotatable shaft 14, together with a magnet system 16 that is non-rotatably fixed within the housing 10. The magnet system 16 comprises at least one ring magnet 18 and associated magnetic pole piece components 20. Small annular gaps 22 bounded by the outside of the shaft and the inside of the pole piece components are filled with ferrofluid 24 (a colloidal suspension of ferromagnetic particles in a low vapor pressure fluid), which is held in place by the intense magnetic field generated by the magnet system 16. The ferrofluid permits the shaft 14 to turn freely but serves to block the flow of gas axially along the shaft, thereby allowing a pressure difference to exist between the "atmosphere" and "vacuum" ends 26 and 28, respectively, of the feedthrough 100. The particular design shown in FIGS. 1A and 1B uses four ring magnets 18 and five pole rings 20 to produce eight sealing gaps 22. Other magnetic designs e.g., one ring magnet with two pole rings are well known.

Some of the major disadvantages of the prior art are:

1. Very Precise Mechanical Tolerances are Required. If the magnetic gap region deviates very much from a true circular annulus, the seal will have reduced pressure capacity, and may not support the required pressure differential. Consequently, shaft and pole pieces must be aligned with great precision. This requires close-tolerance manufacture of housing, pole pieces and shafts. In devices of the type illustrated in FIGS. 1A and 1B, the dimensions of housing bore, shaft diameter, shaft bearing journals, pole piece outer diameter, and pole piece inner diameter are all typically controlled to within 0.0005 inch of their nominal values. In addition, the pole piece outer and inner diameters are typically specified to be concentric to within 0.0005 inch. These values represent a practical compromise between performance and manufacturing cost.

2. Static Sealing of Pole Pieces is Required.

Sealing must be accomplished in two places in prior art rotary feedthroughs. The first (and obvious) seal is the dynamic seal provided by the ferrofluid between the shaft 14 and pole pieces 20. The second is the static seal provided by O-rings 30 or other materials which seal the spaces between the housing and the outer diameter of the pole piece 20. Elimination of these static seals would simplify the feedthrough, improve reliability and reduce cost.

3. Magnetic Flux Leakage is Significant.

Conventional magnetic fluid feedthroughs 100 (FIGS. 1A and 1B) use main magnetic flux paths that include the magnets, pole rings, fluid gaps and shaft. At the outside diameter of the pole piece, some magnetic flux leaks from one pole ring to the next in a parasitic parallel path. This parasitic external flux represents a minor portion of the total magnetic energy in the system. However, the external flux levels are not zero, and are significant in some applications e.g., electron microscopes.

4. Self-Heating of Ferrofluid at High RPM is Significant. At high RPM, a significant amount of heat is generated in the ferrofluid 24 causing the fluid temperature to increase. Heat must flow through the pole piece 20 to some external heat sink, such as the housing 10 or a water-cooling circuit in the pole piece.

SUMMARY OF THE INVENTION

In accordance with the invention a rotatable magnetic fluid sealing device is provided for sealing a rotatable member to maintain a pressure differential between a low pressure environment and a higher pressure environment. The device is comprised of a rotatable shaft which extends from the low pressure environment to the higher pressure environment. A fixed housing encloses the shaft and is affixed to and extends through a barrier wall between the two environments. A magnet system is disposed on, or in the shaft, and is rotatable with the shaft to form a dynamic seal.

The magnet system preferably includes at least two magnets arranged adjacent to each other in opposed polarity to provide a magnetic flux path which extends from the magnets through adjacent portions of the housing. A ferromagnetic fluid is retained by the flux in sealing gaps provided between the magnetic system and adjacent housing portions; thereby forming the dynamic seal.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 2:
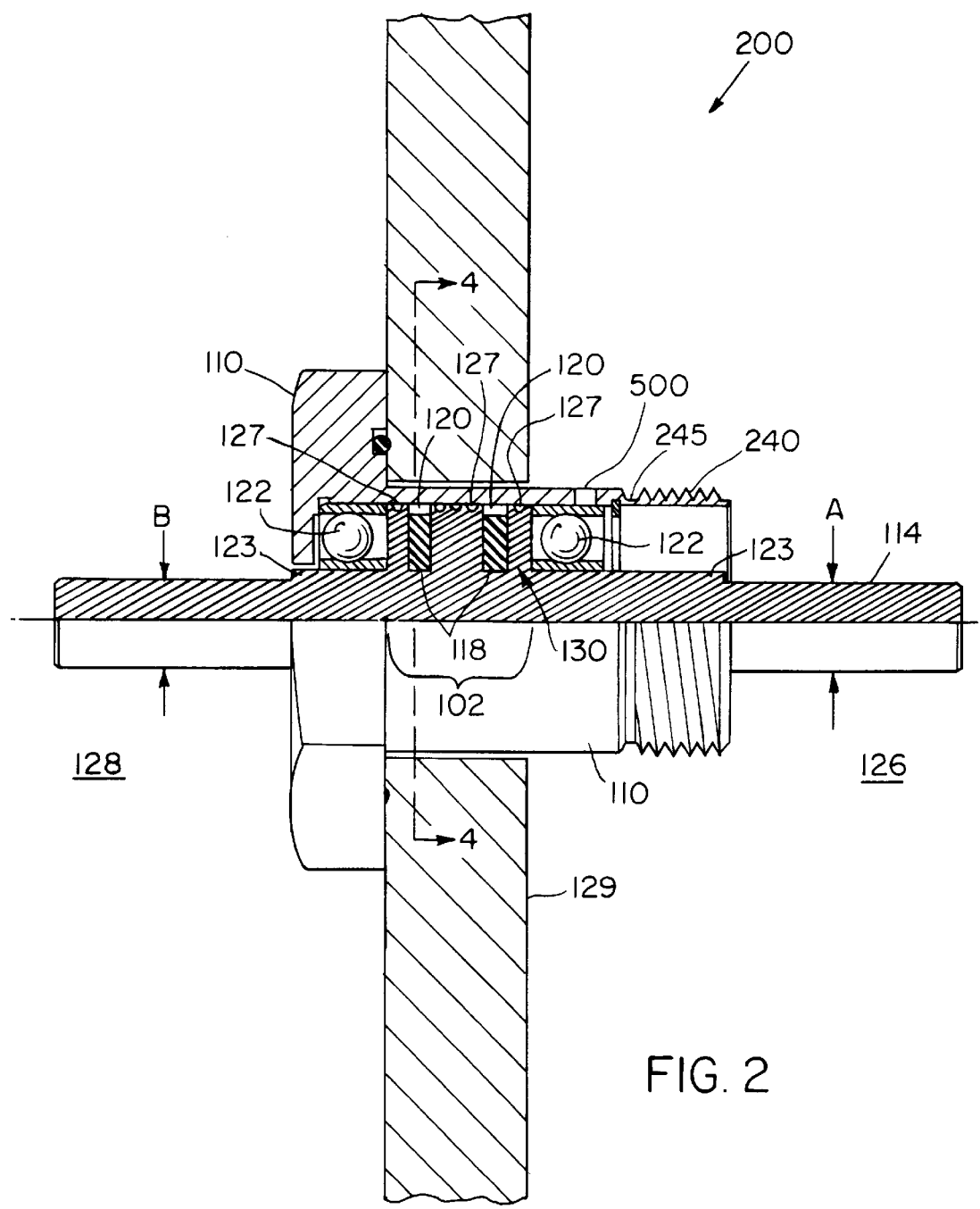
FIG. 2 is a longitudinal partial section of a rotary feedthrough of the present invention.

Referring first to FIG. 2 of the drawings, a preferred embodiment of a feedthrough magnetic sealing device, or feedthrough 200, shown in longitudinal half-section, will be described in detail in connection therewith. It should be understood that the device is symmetric and that therefore only the upper half section needs to be shown. A generally cylindrical housing 110 extends through and is affixed to barrier wall 129. The housing 110 encircles a magnetic rotary shaft 114 which is inserted through a central portion of the housing in an axial direction. The shaft 114 is shown in detail FIGS. 7A and 7B and is machined with ends A and B having an outer diameter of 0.375". While the foregoing dimensions are preferable, any size shaft and central section will work. The criteria are that (a) the shaft ends must be strong enough to work in the end-user's application, (b) the central section must be large enough to contain sufficient magnet material to energize the device, and (c) the central section is preferably (but not absolutely) sized at about the same diameter as the bearings to allow a simple straight-walled housing (no diameter steps) to be used.

Figure 7A:
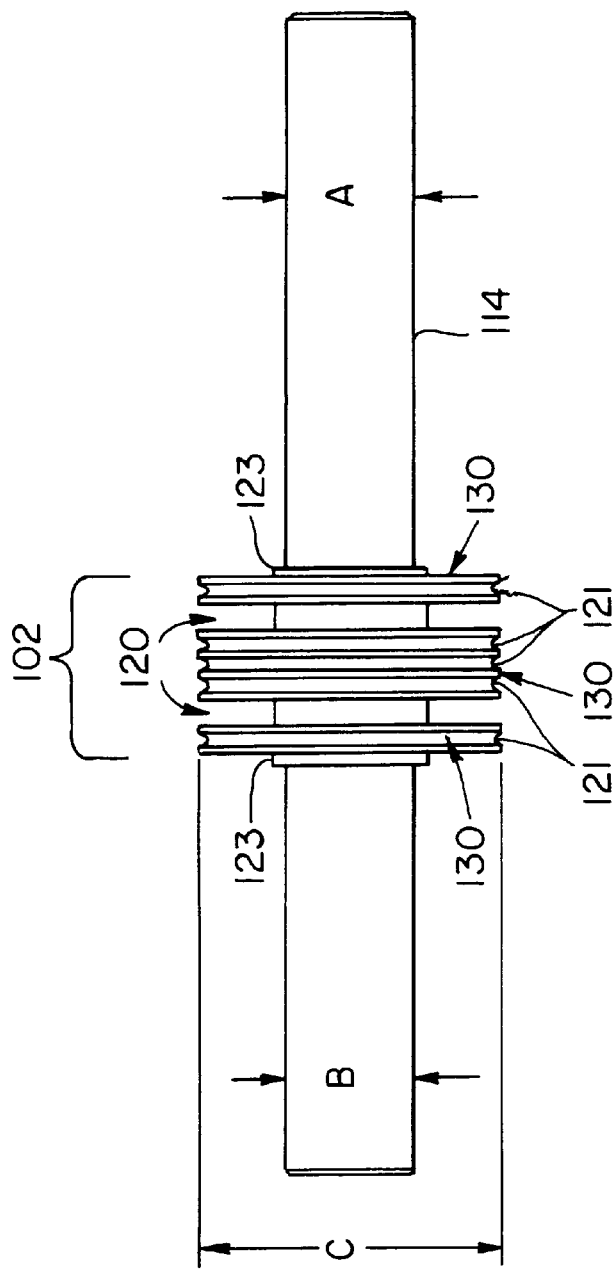
FIG. 7A is a side sectional view of the shaft with integral pole rings of the invention.
Figure 7B:
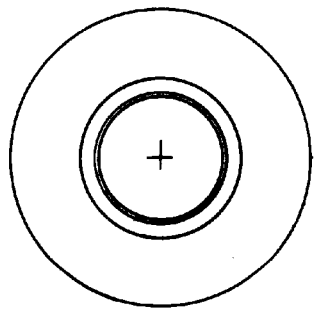
FIG. 7B is an end view of FIG. 7A.

A central section 102 of the shaft of 0.871" diameter is formed with two large grooves ("magnet slots") 120 for containing magnets 118 and five small grooves ("staging grooves") 121 defining pole rings 130 and shoulders 123 against which bearings 122 are mounted. Preferably, the bearings 122 are disposed so as to straddle the sealing region which extends axially between the shoulders 123. (FIGS. 7A and 7B show the shaft prior to assembly as in FIG. 2.

Preferably, shaft 114 is formed of ferromagnetic material suitable for use in the intended process (vacuum) environment in which one end A of the shaft is exposed to the atmosphere 126, and the opposite end B extends through a barrier 129 to a vacuum environment 128.

Magnetic stainless steels (e.g., 17-4PH) are a preferred material for the shaft for most applications. Several ferromagnetic stainless steels are well known as suitable materials for ferrofluid rotary feedthroughs. Any of them can probably be used in connection with this invention.

Figure 6:
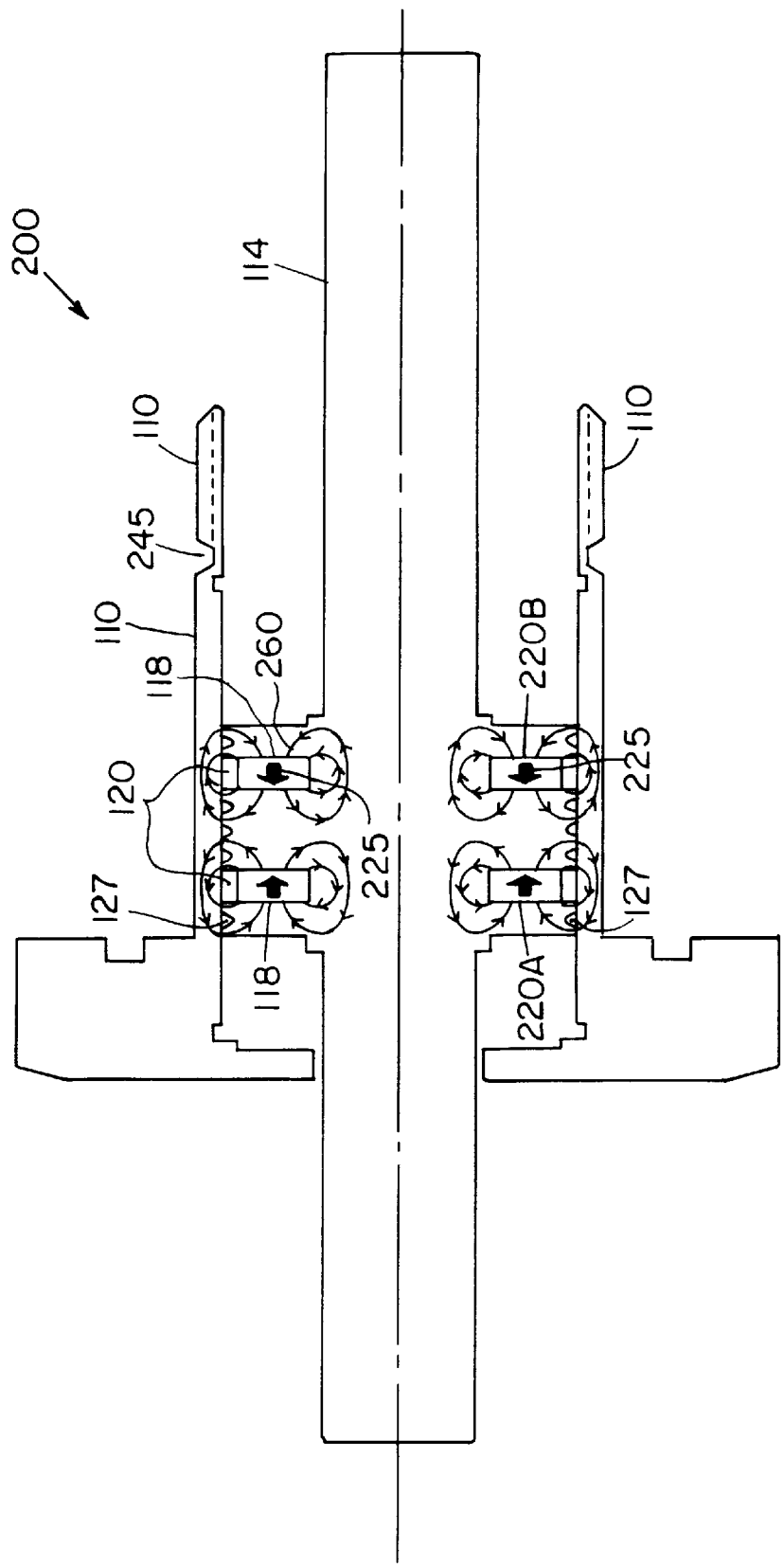
FIG. 6 is a schematic version of FIG. 2 showing the details of the magnetic circuits of the invention.

The function of the staging grooves 121 is to define several distinct pole gaps 127 (in this case eight) spaced axially apart from each other (see FIG. 6). The purpose of the magnet slots 120 is to hold the permanent magnets 118 in place. The magnets 118 provide the magnetic flux in the gaps 127. Preferably the magnets are formed of neodymium iron boron, with an energy product of 35 MGO.

Figure 4:
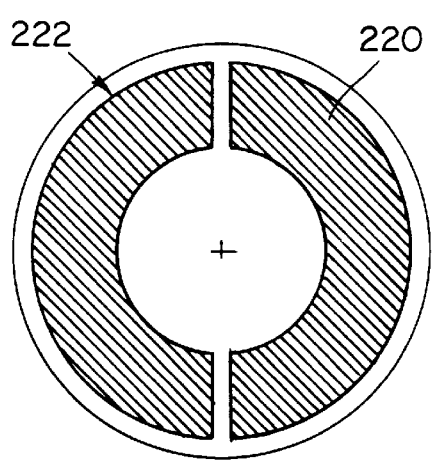
FIG. 4 is a sectional view along the lines 4—4 of FIG. 2 showing a first embodiment of a magnet of the invention.
Figure 5:
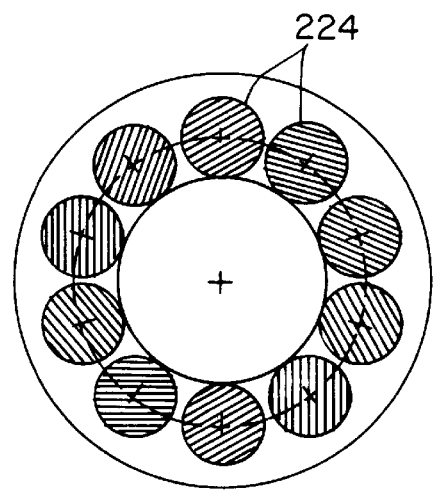
FIG. 5 is a sectional view of a second magnet embodiment of the invention.

The magnets 118 are inserted into the magnet slots 120 of the shaft. The magnets may be half sectors 220 of the ring magnets 222 as shown in FIG. 4 or may be small cylinders 224 ("buttons") as shown in FIG. 5 or any of several sector shapes. All magnets in a single slot have their magnetic polar orientation in the same direction. Preferably magnets in the second slot are oriented with magnetic polarity opposite to the magnets in the first slot as shown by the direction of arrows 225 in FIGS. 2 and 6. This opposed-polarity condition results in a finished assembly with enhanced magnetic flux in the sealing gaps and minimum external magnetic field as will be explained below. Magnets 118 must be positively retained in the slots in order to prevent them from sliding out as a result of mutual magnetic repulsion or centrifugal force. The means of retention is not shown here. Typical retention methods would be (1) epoxy to secure the magnets in the grooves, (2) a thin wire or band placed as a hoop around the magnets or (3) rolled edges on the magnet slots. In any case, the retaining means must not extend radially beyond the slot boundary, or it will contact the housing inner surface during rotation.

Figure 1A:
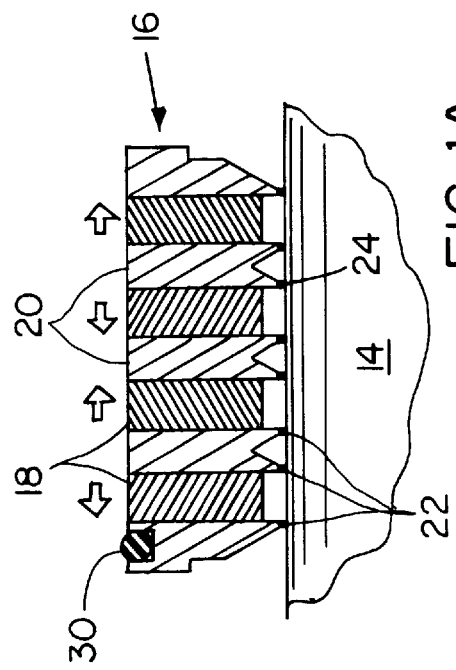
FIG. 1A is an exploded view of a portion of FIG. 1B.
Figure 1B:
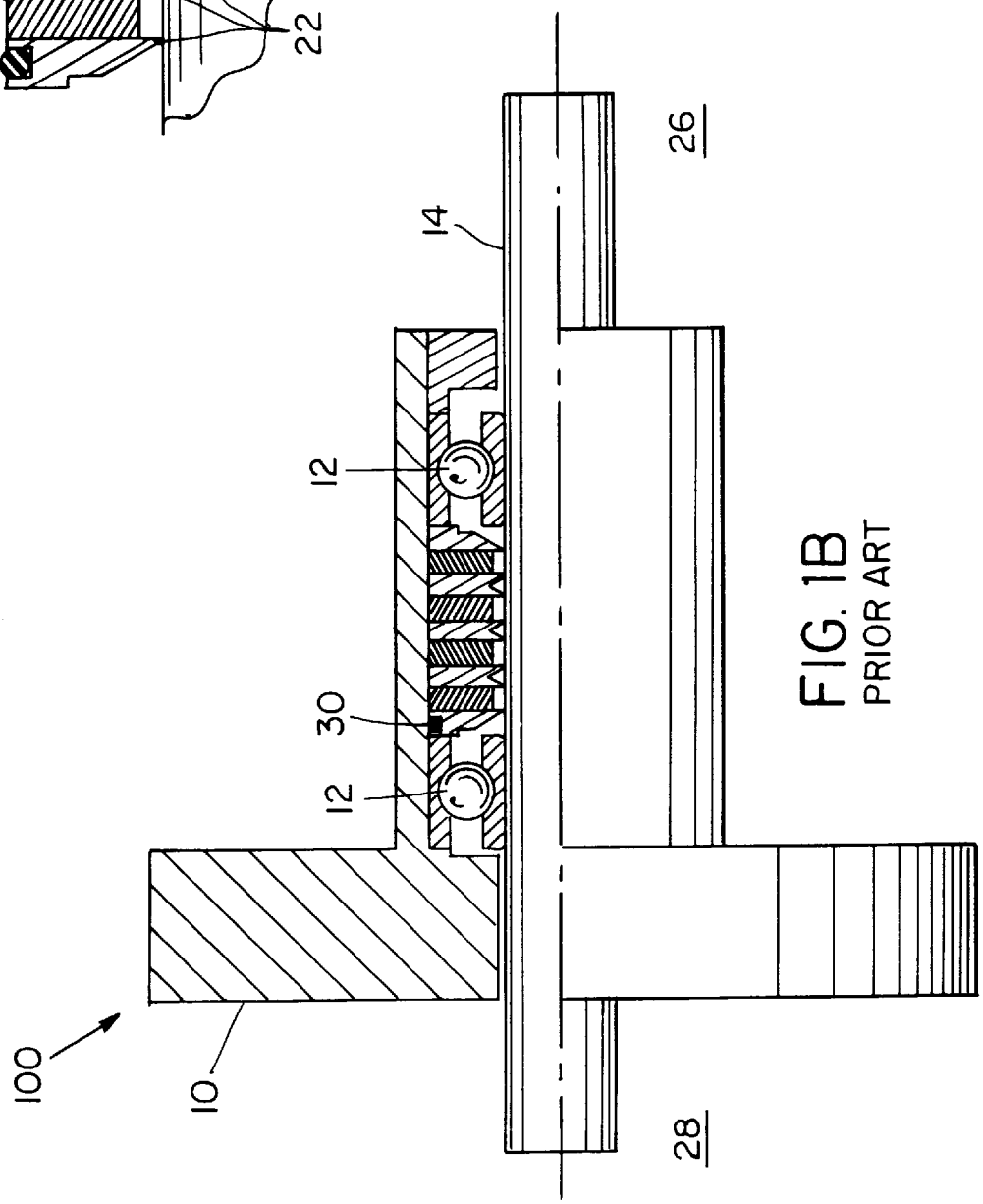
FIG. 1B is a longitudinal partial section of a prior art rotary feedthrough.
Figure 3B:
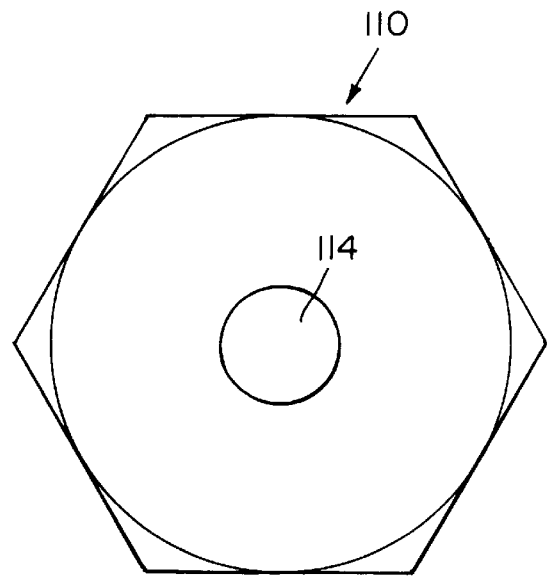
FIG. 3B is an end view of FIG. 3A.
Figure 3A:
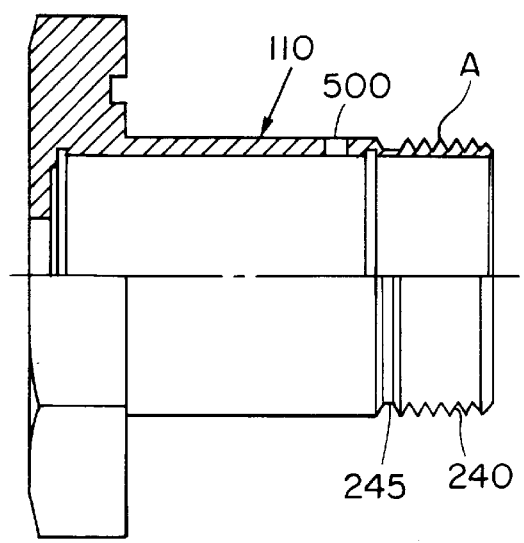
FIG. 3A is a longitudinal partial section of a housing for the feedthrough of the present invention.

A simple housing 110 is shown in FIGS. 3A and 3B with an inner diameter slightly larger than the preferred O.D. of the mid-section 102 (see FIGS. 2, 7A and 7B) of shaft 114, i.e., 0.875" the housing 110 serves to contain the shaft-bearing magnet subassembly and to provide a means of mounting the feedthrough 200 on the barrier 129 and within the vacuum system. The threaded section 240 at the A end of the housing will accept a nut (not shown) which holds the feedthrough securely on the vacuum chamber wall or barrier 129. Other mounting configurations are possible (e.g., the flange style as shown in FIGS. 1A and 1B.)

The material for housing 110 is also ferromagnetic and should also be compatible with the process (vacuum) environment. Again, magnetic stainless steels are preferred. The material need not necessarily be the same as the shaft material. For example, 416 stainless steel can be used successfully as the housing material in combination with 17-4PH as the shaft material. Also, it is not necessary that the entire housing be formed of magnetic material. A sleeve (not shown) of ferromagnetic material can be used adjacent the magnets and pole rings to provide a complete flux path.

During the final assembly process, a small amount of ferrofluid (not shown) is placed on the outer surface of the shaft-bearing-magnet subassembly. This fluid becomes distributed among the magnetic gaps 127, thereby isolating the gas in the staging grooves 121. Each sealing stage thus created is required to support only a fraction of the total pressure differential across the feedthrough 200.

The final assembly step is to add a wave washer (not shown) and retaining ring (not shown) at the atmosphere end of the assembly. The wave washer is partially compressed as the retaining ring is pressed axially inward to the point at which the retaining ring can expand outward into the groove 245 in the housing. The axial force developed as the wave washer is compressed provides a preload on the bearings 122, stabilizing the entire device.

Magnetic Circuits Discussion. All known previous implementations of ferrofluid rotary feedthrough technology have kept the magnets (1) outside of or external to the shaft, and (2) stationary relative to the housing. It is believed that the main reason for this is the desire to maximize the amount of magnetic energy in the sealing gaps, and to minimize extraneous magnetic flux elsewhere. In the previously described configuration of the present invention the housing is an essential part of the magnetic circuits which include the sealing gaps. Therefore, the stray external fields are reduced, while still achieving sufficient magnet flux levels in the sealing gaps.

In prior art, pole pieces are used to capture and direct magnetic flux lines from the faces of a permanent magnet, thereby concentrating the magnetic energy to produce a large flux density in the desired working gap. Any flux paths which parallel the principal magnetic circuit are regarded as parasites, stealing magnet energy from the path where it is desired. Such a parasitic situation exists in the present feedthrough invention as illustrated in FIG. 6. Ring magnets 220 "A" and 220 "B" produce magnetic flux 260 in the shaft 114 and housing 110. Some of the flux paths as indicated by the arrow lines lie entirely within the interior of the shaft 114. Some flux paths cross the sealing gaps and link to the housing 110. The paths in the interior of the shaft do not contribute to the magnetic flux in the sealing gaps. These paths are parasitic; they "steal" energy from the working regions (the sealing gaps).

The flux in the sealing gaps 127 has been calculated for this present system using computer generated techniques, and it is predicted for this system that the can be large enough to hold the ferrofluid in the gaps 127, so that the sealing function continues to exist, despite the substantial loss of magnetic energy in the interior of the shaft. For example, for a device made with the dimensions discussed previously, using a shaft made of 17-4PH stainless steel, a housing made of 416 stainless steel, and magnets made of samarium-cobalt alloy (energy product 18 MGO), the magnetic flux level in the sealing gaps was calculated to be approximately 10,000 gauss. It is known from prior art that this level of magnetic flux is sufficient to produce ferrofluid seals which are highly reliable in vacuum applications. The flux level is not as high as in traditional 4-layer opposed polarity external pole piece (the style shown in FIG. 1A), where sealing gap flux levels as high as 15,000 gauss are achieved. The minimum flux level required to produce a reliable seal is not known with great accuracy, but it may be as low as 2,000 gauss. It is clear, therefore, that the rotating magnet system principle of the present invention is well able to serve as the basis for practical feedthroughs.

Magnets with high energy product are preferred in this invention. If the magnet energy product is too low, the flux in the gaps will be too small to hold the ferrofluid against the pressure differential per stage. This would require more stages, thereby increasing machining cost and (possibly) overall length of the device. However, if the cost tradeoff for some particular combinations of materials (e.g., 416 stainless shaft and Alnico magnets) should happen to favor those combinations, there is no reason that the present rotating magnet system principles of the invention could not be applied to feedthroughs using such materials. The novel magnetic design is not limited to the particular preferred shaft and magnet materials disclosed herein.

Note that the drawing of FIG. 6 illustrates clearly the fact that the housing or a housing sleeve (not shown) must be made of ferromagnetic material. The sealing gaps are formed by the interior wall of the housing in combination with the exterior surfaces of the shaft. If the housing were not ferromagnetic, there would be no return path for magnetic flux lines leaving the exterior surfaces of the shaft.

The system of the invention in simple terms can be envisioned as an "inverted" version of the traditional prior art magnet system. This inversion leads to several important benefits:

a. It is possible to use the housing as part of the magnetic circuit, thereby increasing the functionality of both the shaft and the housing, with the net result that several magnetic components (i.e., the pole pieces) can be eliminated.

b. The magnetic circuits are all closed within the device itself. In prior art designs (FIGS. 1A and 1B), the inner circuits (the ones which include the fluid and the shaft) are closed within the device, but the parasitic circuits at the outside of the pole pieces are not closed, and magnetic energy leaks outside the device, since the housing is traditionally made of non-magnetic stainless steel. In the present invention, however, portions of the housing next to the seal must be ferromagnetic, and there are no open magnetic gaps anywhere in the system. There are parasitic circuits, but they lie entirely within the shaft. The working circuits are the ones which include the housing. The housing serves as a natural magnetic shield, and can be made as thick-walled as desired to provide additional shielding. This can be a useful feature in applications which are sensitive to external magnetic fields (e.g., electron microscopes).

c. The fluid region runs cooler under high-speed conditions than in conventional designs, thereby reducing the deleterious effects of elevated temperature. Heat is generated when magnetic fluid seals are rotated, because the fluid is viscous and is continuously sheared by the rotation. In designs which use the prior art, if the operating speeds are low, the amount of heat generated in the fluid can flow effectively through the pole rings to the housing, where it is dissipated to the universe surrounding the feedthrough. However, as the speed increases, the quantity of heat also increases, and the fluid temperature must increase to drive the larger amount of heat radially outward through the pole rings to the housing. In this invention, the fluid shearing occurs at the inside surface of the housing, resulting in the minimum possible path length for heat to flow to the external universe. Hence, in high-speed operation, the temperature rise in the fluid will be less than in the conventional design. In very-high-speed applications, the housing can be machined to include external cooling (not shown) such as by cooling fins (ambient cooling) or a water jacket (water cooling).

Note however, that for any given shaft size, the diameter of the fluid seal region will be larger in the present invention than in the conventional design. Hence, for a given RPM, the heat generated by fluid shear will be larger. The fluid temperature rise depends on the balance between the heat quantity and the efficiency of the heat flow path. In virtually all practical cases, the tradeoff favors the present invention, i.e., the shorter path length for heat flow greatly outweighs the larger quantity of heat which must be dissipated. As shaft diameters increase, the balance shifts steadily in favor of the shorter path length.

The system as illustrated uses two ring magnets in opposed-polarity arrangement. This is preferred to a single ring magnet system because (1) the fringe magnetic field external to the feedthrough is minimized, (2) the device as a whole has no net magnetic polarity, and (3) magnetic flux is enhanced in the gaps which are located axially between the magnets. Items (1) and (2) are important in applications (e.g., electron and ion microscopes) in which other system components may be sensitive to magnetic fields. Item (3) is important because it increases the pressure capacity per sealing stage. Item (3) occurs because the two ring magnets "buck" each other in the region which lies between them; each magnet blocks the free spreading of the magnetic field of the other, thereby "squeezing" the energy into a smaller volume and concentrating it.

Fluid Filling

In accordance with another feature of the invention, a fluid fill hole 500 is provided by, for example, drilling a hole through housing 110 (FIGS. 2 and 3A). Its purpose is to facilitate loading the ferrofluid into the device during the assembly process.

Prior art devices load ferrofluid into the interior of the pole piece assembly 16 (refer to FIG. 1A) before inserting the shaft 14. When the shaft is then pushed through the pole piece, some of the fluid is dragged out, adhering to the shaft surface. This is very messy and must be cleaned up.

The corresponding assembly method for the present device would be to load ferrofluid onto the outside diameter of the shaft/magnet/bearing assembly 102 (the magnetic field will hold it in place) and slide the entire assembly into the housing. Some fluid will be dragged off and require cleaning. This method is feasible, but messy.

Preferably, however, using the fill hole 500, it is possible to avoid the mess and the associated waste of expensive ferrofluid. In the fully assembled state as shown in FIG. 2, the fluid fill hole is covered by the outer surface of the atmosphere-side bearing 122. However, as the shaft bearing assembly is slid into the housing, the OD of the shaft is visible through the hole. It is easy to add fluid through this hole directly onto the shaft OD at appropriate points during assembly, with the result that no excess fluid is used, and no mess is experienced. At most, a small drop remains in the fill hole, and is easily wiped off.

Equivalents

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims. For example, while eight sealing stages are shown herein, it is known that more stages, i.e. 16, will increase the pressure handling capability. Also, it is possible to insert the shaft 114 from the vacuum rather than the atmospheric side.

What is claimed is:

1. A device for coupling rotary motion between first and second environments separated by a barrier comprising:
   a. a housing non-rotatably affixed to, and extending through, said barrier;
   b. a rotatable shaft of ferromagnetic material extending from the first environment to the second environment through the housing; and
   c. a magnet system, intermediate the ends of the shaft, the system forming a dynamic fluid seal between the rotatable shaft and the fixed housing and wherein the magnet system includes pole rings formed on the shaft with at least one magnet mounted between a pair of pole rings such that the magnet is constrained to rotate with the shaft and wherein at least a portion of the housing adjacent to the magnet system is formed of ferromagnetic material.

2. The device of claim 1 wherein the magnet system includes at least one magnet mounted coaxial to said shaft for generating lines of magnetic flux, and wherein the magnet is disposed coaxial to said shaft.

3. The device of claim 2 including pole rings for concentrating the flux and in which the rings are formed as an integral part of the shaft.

4. The device of claim 2 in which a wall of the housing incorporates a heat loss mechanism.

5. The device of claim 4 in which a hole is provided in said wall to permit entry of a ferrofluid which is retained by said magnets to form said seal.

6. The device of claim 1 wherein the magnet system includes at least two magnets of opposite polarity.

7. The device of claim 6 in which an even number of magnets is employed, and the magnets are ring magnets.

8. The device of claim 6 in which an odd number of magnets are employed, and the magnets are ring magnets.

9. The device of claim 1 in which the rotatable magnetic system forms a flux path which is completed by a ferromagnetic path formed outside the rotatable magnetic system.

10. The device of claim 9 in which a ferromagnetic fluid is retained in the flux path by magnetic force.

11. The method of coupling rotary motion between a first and second environment separated by a barrier comprising the steps of:
    a. forming a ferromagnetic rotatable shaft
    b. extending the rotatable shaft from the first environment to the second environment through the barrier;
    c. encircling the shaft within a fixed housing attached to and extending through the barrier; and forming at least a portion of the housing adjacent the shaft of ferromagnetic material;
    d. sealing the shaft with a rotatable magnetic fluid system which rotates with the shaft and wherein the rotatable magnetic fluid system comprises one or more magnets affixed to slots provided between pole rings formed on the shaft and rotatable with the shaft and includes the step of retaining a ferromagnetic fluid between the magnets and the portion of the housing formed of ferromagnetic material.

12. A magnetic fluid sealing device comprising:
    a. a housing;
    b. an axially extending ferromagnetic shaft having pole rings formed as an integral part of the shaft rotatably mounted within said housing and wherein one end of the shaft is adapted to be disposed at a low pressure environment and another end at a high pressure environment; and
    c. at least one magnet for generating a magnetic flux which extends through said ferromagnetic portion of said housing, the magnet radially encircling said shaft and retained between said pole rings and rotatable therewith and forming with a magnetic fluid a magnetic fluid seal for sealing of gaps which may exist between the shaft and the housing.

13. The device of claim 12 wherein the housing is formed of magnetic material located adjacent to the magnets.

14. A method of forming a seal for a rotary shaft enclosed in a housing, the shaft having first and second ends axially extending between a low pressure atmosphere and a higher pressure atmosphere comprising the steps of forming the shaft of ferromagnetic material, forming a magnetic seal about radial gaps located between the shaft and the housing using magnetic energy provided by at least one magnet affixed to the shaft in a space between pole rings which are formed integral to the shaft and providing a ferrofluid in said gaps which is retained by said magnetic energy and wherein said gaps are formed by grooves in an outer diameter of said rings.

15. The method of claim 14 including at least two magnets axially spaced from one another and disposed to be of opposed polarity.

16. The method of claim 15 including the step of retaining the magnets from axial or longitudinal movement.

17. The method of claim 14 including the step of providing a hole in said housing for entry of said ferrofluid during assembly.

18. The method of coupling rotary motion between a first and second environment separated by a barrier comprising the steps of:
    a. forming a ferromagnetic rotatable shaft
    b. extending the rotatable shaft from the first environment to the second environment through the barrier;
    c. encircling the shaft within a fixed housing attached to and extending through the barrier; and forming at least a portion of the housing adjacent the shaft of ferromagnetic material;
    d. sealing the shaft with a magnetic fluid system; and
    e. affixing one or more magnets to slots provided between pole rings formed on the shaft and rotatable with the shaft and retaining both the magnets and a ferromagnetic fluid between the magnets and the portion of the housing formed of ferromagnetic material.

* * * * *

UNITED STATES PATENT AND TRADEMARK OFFICE
CERTIFICATE OF CORRECTION

PATENT NO. : 5,975,536
DATED : November 2, 1999
INVENTOR(S) : Walter Helgeland

It is certified that error appears in the above-identified patent and that said Letters Patent is hereby corrected as shown below:

Column 4, line 40, delete "Ring" and insert -- Axially polarized (as indicated by the four large bold arrows in FIG. 6) ring --.
Column 7, line 19, insert -- axially polarized -- before the word "magnet".
Column 7, line 59, insert -- axially polarized -- before the word "magnets".
Column 8, line 13, insert -- axially polarized -- before the word "magnet".
Column 8, line 28, insert -- axially polarized -- before the word "magnet".
Column 8, line 53, insert -- axially polarized -- before the word magnets".

Signed and Sealed this

Twenty-fifth Day of April, 2000

Attest:

Q. TODD DICKINSON

*Attesting Officer*

*Director of Patents and Trademarks*